US009899697B2

(12) United States Patent
Kim

(10) Patent No.: US 9,899,697 B2
(45) Date of Patent: Feb. 20, 2018

(54) MANIFOLD BLOCK ASSEMBLY FOR FUEL CELL VEHICLES

(71) Applicants: HYUNDAI MOTOR COMPANY, Seoul (KR); KIA MOTORS CORPORATION, Seoul (KR)

(72) Inventor: Duck Whan Kim, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 159 days.

(21) Appl. No.: 14/852,399

(22) Filed: Sep. 11, 2015

(65) Prior Publication Data

US 2016/0141704 A1    May 19, 2016

(30) Foreign Application Priority Data

Nov. 13, 2014   (KR) .................. 10-2014-0157925

(51) Int. Cl.
*H01M 8/24*        (2016.01)
*H01M 8/2484*      (2016.01)
*H01M 8/2485*      (2016.01)

(52) U.S. Cl.
CPC ....... *H01M 8/2484* (2016.02); *H01M 8/2485* (2013.01); *H01M 2250/20* (2013.01); *Y02P 70/56* (2015.11); *Y02T 90/32* (2013.01)

(58) Field of Classification Search
None
See application file for complete search history.

(56) References Cited

U.S. PATENT DOCUMENTS

| 5,472,800 | A | 12/1995 | Goto et al. | |
|---|---|---|---|---|
| 6,403,247 | B1 * | 6/2002 | Guthrie | H01M 8/249 429/434 |
| 2006/0234106 | A1 * | 10/2006 | Duffield | H01M 8/2485 429/458 |
| 2007/0020502 | A1 | 1/2007 | Cho et al. | |

(Continued)

FOREIGN PATENT DOCUMENTS

| JP | H07-45300 A | 2/1995 |
|---|---|---|
| JP | 10-2007-0012128 A | 1/2007 |

(Continued)

OTHER PUBLICATIONS

Korean Office Action dated May 11, 2017 issued in Korean Patent Application No. 10-2014-0157925 (with English translation).

*Primary Examiner* — Scott J Chmielecki
(74) *Attorney, Agent, or Firm* — McDermott Will & Emery LLP

(57) ABSTRACT

A manifold block assembly for a fuel cell vehicle mounted on a fuel cell stack and supplying air and hydrogen to the stack, includes a manifold block in which a hydrogen discharge path connected to a hydrogen line formed in the stack, an air discharge path connected to an air line formed in the stack, and a watertight bulkhead are integrally formed with each other. The manifold block assembly further includes a hydrogen inflow pipe configured to be attached to the manifold block and connected to the hydrogen line formed in the stack. The manifold block assembly also includes an air inflow pipe configured to be attached to the manifold block and connected to the air line formed in the stack.

2 Claims, 5 Drawing Sheets

(56) References Cited

U.S. PATENT DOCUMENTS

| | | | |
|---|---|---|---|
| 2007/0264542 A1* | 11/2007 | Devoe | H01M 8/0297 429/432 |
| 2008/0226964 A1* | 9/2008 | Nishiyama | H01M 8/0267 429/443 |
| 2010/0015481 A1* | 1/2010 | Kanao | H01M 8/002 429/456 |
| 2011/0207013 A1* | 8/2011 | Crumm | G01F 1/68 429/457 |
| 2011/0281193 A1* | 11/2011 | Levesque | H01M 8/0204 429/457 |
| 2013/0017470 A1 | 1/2013 | Hotta et al. | |
| 2013/0295481 A1* | 11/2013 | Kim | H01M 8/04007 429/434 |
| 2014/0158281 A1* | 6/2014 | Kim | H01M 8/0297 156/73.6 |
| 2014/0234743 A1* | 8/2014 | Sasamoto | H01M 8/04089 429/456 |
| 2015/0214566 A1* | 7/2015 | Jung | H01M 8/04097 429/458 |
| 2016/0093911 A1* | 3/2016 | Nishiyama | H01M 8/2485 429/458 |

FOREIGN PATENT DOCUMENTS

| | | |
|---|---|---|
| JP | 5354026 B2 | 11/2013 |
| KR | 10-0765659 B1 | 10/2007 |
| KR | 10-1230992 B1 | 2/2013 |
| KR | 10-1272594 B1 | 6/2013 |
| KR | 10-1337961 B1 | 12/2013 |

* cited by examiner

US 9,899,697 B2

MANIFOLD BLOCK ASSEMBLY FOR FUEL CELL VEHICLES

CROSS-REFERENCE TO RELATED APPLICATION

This application is based on and claims the benefit of priority to Korean Patent Application No. 10-2014-0157925, filed on Nov. 13, 2014 in the Korean Intellectual Property Office, the disclosure of which is incorporated herein in its entirety by reference.

TECHNICAL FIELD

The present disclosure relates to a manifold block assembly for a fuel cell vehicle, and more particularly, to a manifold block assembly for a fuel cell vehicle capable of improving cold startability of the fuel cell vehicle.

BACKGROUND

A fuel cell stack provided in a fuel cell vehicle includes a manifold block assembly which allows gases and coolant to be introduced into the fuel cell before being reacted and to be discharged from the fuel cell after being reacted.

Known manifold block assemblies are manufactured in one aluminum block form including air inlet, air outlet, hydrogen inlet, and hydrogen outlet lines.

However, due to a complicated structure, the manifold block assembly can be manufactured only by sand casting, such that it is difficult to secure a product quality. In addition, the productivity is also low.

Moreover, since the air inlet line is made of aluminum, temperature of an inflow air which is introduced through a humidifier at the time of start-up at a low temperature of −25° C. is decreased by 6° C. or more while passing through the manifold block. This reduction in temperature hinders cold startability of the fuel cell vehicle.

SUMMARY

The present disclosure has been made to solve the above-mentioned problems occurring in the prior art while advantages achieved by the prior art are maintained intact.

An aspect of the present disclosure provides a manifold block assembly for a fuel cell vehicle capable of improving cold startability of the fuel cell vehicle so as to prevent a temperature of an inflow air from being decreased even through the inflow air passes through the manifold block at the time of starting-up at a low temperature of −25° C.

According to an exemplary embodiment of the present disclosure, a manifold block assembly for a fuel cell vehicle mounted on a fuel cell stack and supplying air and hydrogen to the stack, includes a manifold block in which a hydrogen discharge pipe connected to a hydrogen line formed in the stack, an air discharge pipe connected to an air line formed in the stack, and a watertight bulkhead maintaining watertight of the stack are integrally formed with each other. The manifold block assembly further includes a hydrogen inflow pipe configured to be attached to the manifold block and connected to the hydrogen line formed in the stack. The manifold block assembly also includes an air inflow pipe configured to be attached to the manifold block and connected to the air line formed in the stack. The hydrogen inflow pipe and the air inflow pipe may be made of plastic.

According to another exemplary embodiment of the present disclosure, A manifold block assembly for a fuel cell vehicle includes a manifold block in which an air discharge path connected to an air line formed in the fuel cell stack and a hydrogen discharge path connected to a hydrogen line formed in the fuel cell stack are integrally formed with each other.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The present disclosure is described with reference to the accompanying drawings.

Figure 1:
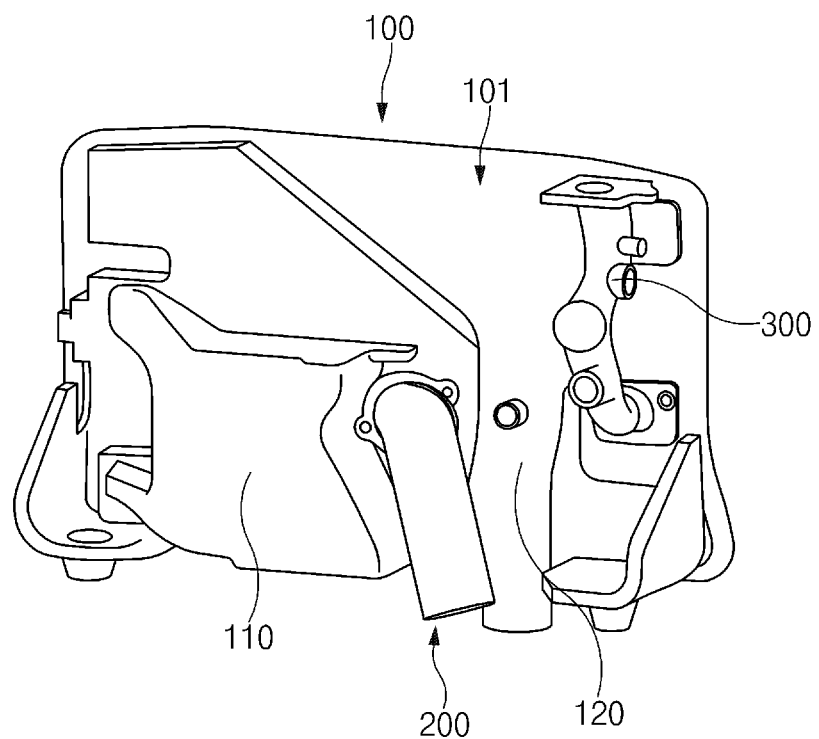
FIG. 1 is a perspective view of a manifold block assembly for a fuel cell vehicle according to an exemplary embodiment of the present disclosure.
Figure 2:
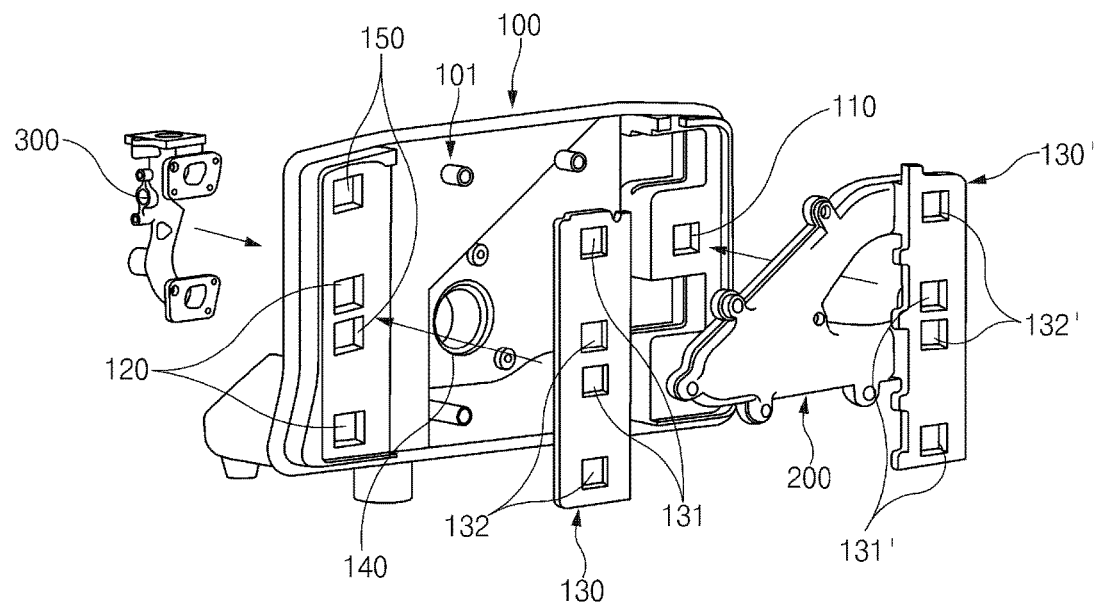
FIG. 2 is a perspective view of another manifold block assembly for a fuel cell vehicle of FIG. 1.
Figure 3:
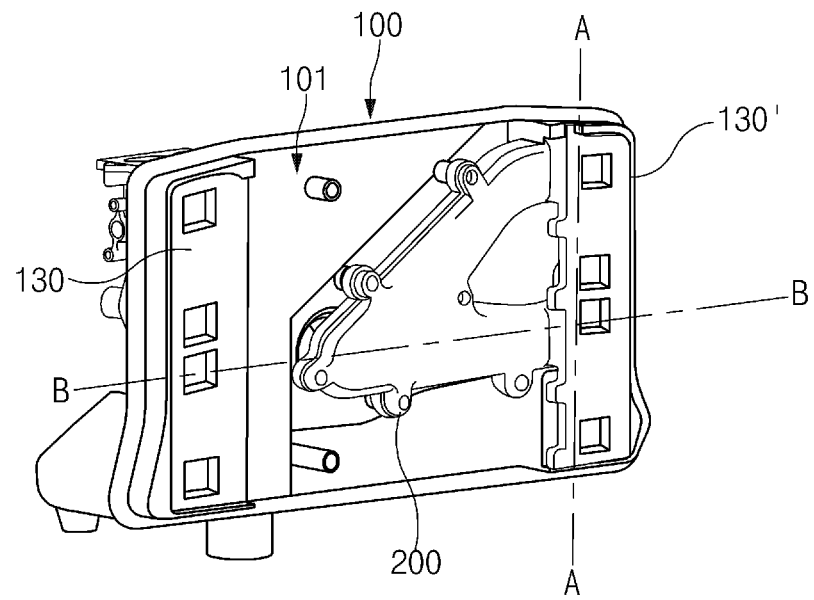
FIG. 3 is a perspective view of still another manifold block assembly for a fuel cell vehicle of FIG. 1.
Figure 4:
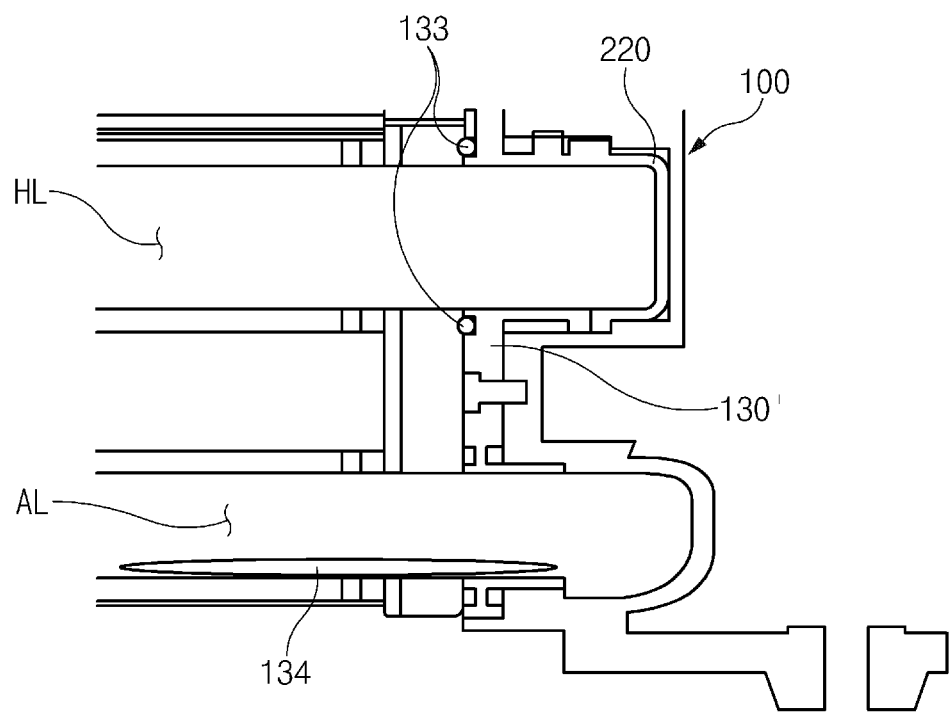
FIG. 4 is a cross-sectional view taken along line A-A' of FIG. 3.

A manifold block assembly for a fuel cell vehicle is mounted on a fuel cell stack and supplies air and hydrogen to the stack. As shown in FIGS. 1 to 5, the manifold block assembly may include a manifold block 100 in which a hydrogen discharge path 110 connected to a hydrogen line (HL), shown in FIG. 4, is formed in the stack. The manifold block assembly further includes an air discharge path 120 connected to an air line (AL), shown in FIGS. 4 and 5, formed in the stack. The manifold block assembly further includes a watertight bulkhead 101 preventing water inflow in the manifold block. The manifold block 100, the air discharge path 120, and the watertight bulkhead 101 are integrally formed with each other. In addition, the manifold block assembly includes a hydrogen inflow pipe 300 configured to be attached to the manifold block 100 and connected to the hydrogen line HL formed in the stack. The manifold block assembly also includes an air inflow pipe 200 configured to be attached to the manifold block 100 and connected to the air line AL formed in the stack.

The hydrogen inflow pipe 300 can be made of aluminum or plastic, and the air inflow pipe 200 can be made of plastic. In an exemplary embodiment of the present disclosure, the manifold block 100 is made of aluminum by cast, and the hydrogen inflow pipe 300 and the air inflow pipe 200 are made of plastic by injection.

In the manifold block 100, the air discharge path 120 connected to the air line AL formed in the fuel cell stack, and the hydrogen discharge path 110 connected to the hydrogen line HL formed in the stack can be integrally formed with each other. In addition, the manifold block 100 includes a mounting hole 140, shown in FIG. 2, formed so as to mount the air inflow pipe 200 introducing air into the air line AL formed in the stack and hydrogen through hole 150 formed so as to communicate with the hydrogen inflow pipe 300 introducing hydrogen into the hydrogen line HL formed in the stack and penetrate through the manifold block 100.

The manifold block 100 includes the hydrogen discharge path 110, the air discharge path 120, and an insulation cover 130 mounted on the hydrogen inflow pipe 300 and the air inflow pipe 200. The insulation cover 130 prevents leakage of the air path and prevents the electric breakdown through the condensate water, to secure insulation resistance of the manifold block 100.

The insulation cover 130 includes an extended part 134, shown in FIG. 4, extending up to an inner side wall surface of the hydrogen line HL or an inner side wall surface of the air line AL through the hydrogen discharge path 110 or the air discharge path 120, and closely adhered to the inner side wall surface. The insulation cover 130 includes a hydrogen connection path 131 connecting the hydrogen discharge path 110, the hydrogen inflow pipe 300, and the hydrogen line HL to each other. The insulation cover 130 also includes an air connection path 132 connecting the air discharge path 120, the air inflow pipe 300, and the air line AL to each other.

The insulation cover 130 includes gaskets 133, shown in FIG. 4, provided at both ends of the hydrogen connection path 131 and the air connection path 132 and preventing leakage of hydrogen or air flowing through the hydrogen connection path 131 or the air connection path 132.

Figure 5:
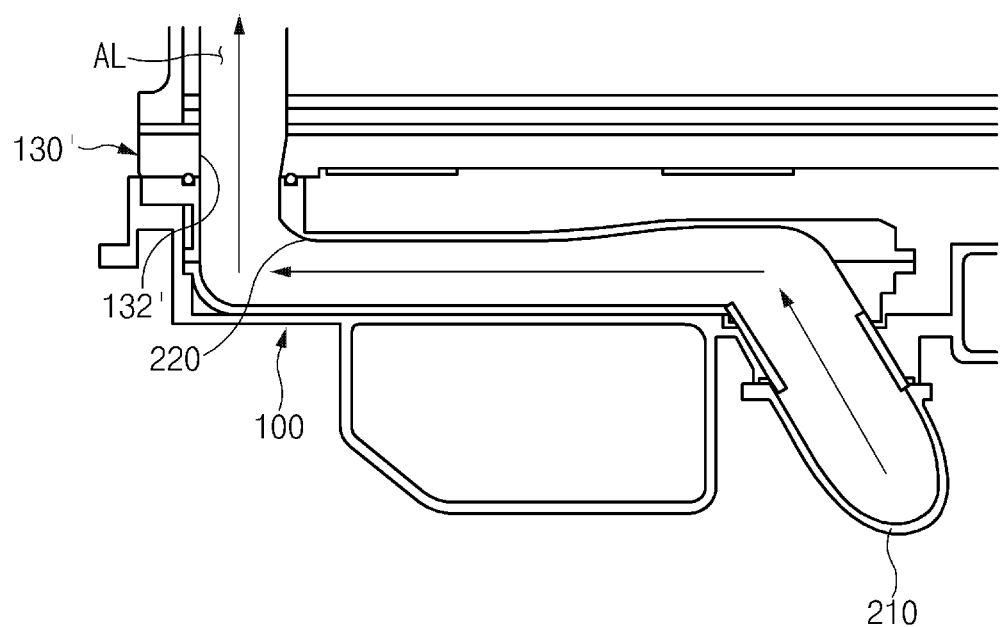
FIG. 5 is a cross-sectional view taken along line B-B' of FIG. 3.

The air inflow pipe 200 includes an air hose 210, shown in FIG. 5, mounted in the mounting hole 140 formed in the manifold block 100. The air inflow pipe 200 also includes an inner side inflow path 220, shown in FIGS. 4 and 5 extended along the watertight bulkhead 101 from the air hose 210.

According to the manifold block assembly for a fuel cell vehicle of the present disclosure as described above, the air inflow pipe 200 is made of a material which is different from that of the manifold block 100, such that a temperature of the air which is introduced into the fuel cell stack through the air inflow pipe 200 even at the time of starting-up at a low temperature of −25° C. may not be decreased, and thereby improve cold startability of the fuel cell vehicle.

In addition, as compared to known manifold blocks, the manifold block 100 of the present disclosure has a simple structure, and therefore, it can be manufactured using other manufacturing methods rather than sand casting.

Further, the manifold block 100 may have an improved product quality and increased productivity.

Further, since the hydrogen inflow pipe 300 and the air inflow pipe 200 are made of plastic, total weight may be decreased.

Although the present disclosure has been described with reference to exemplary embodiments and the accompanying drawings, it would be appreciated by those skilled in the art that the present disclosure is not limited thereto but various modifications and alterations might be made without departing from the idea of the present disclosure and the scope defined in the claims.

What is claimed is:

1. A manifold block assembly for a fuel cell vehicle mounted on a fuel cell stack and supplying air and hydrogen to the fuel cell stack, comprising:
    a manifold block in which a hydrogen discharge path connected to a hydrogen line is formed in the fuel cell stack, an air discharge path connected to an air line formed in the fuel cell stack, and a watertight bulkhead maintaining the watertight configuration of the fuel cell stack, wherein the manifold block, the air discharge path and the watertight bulkhead are integrally formed with each other;
    a hydrogen inflow pipe configured to be attached to the manifold block and connected to the hydrogen line formed in the fuel cell stack; and
    an air inflow pipe configured to be attached to the manifold block and connected to the air line formed in the fuel cell stack,
    wherein the manifold block includes:
    the hydrogen discharge path, the air discharge path, and an insulation cover mounted on the hydrogen inflow pipe and the air inflow pipe,
    wherein the insulation cover includes:
    a hydrogen connection path connecting the hydrogen discharge path, the hydrogen inflow pipe, and the hydrogen line to each other; and
    an air connection path connecting the air discharge path, the air inflow pipe, and the air line to each other.

2. The manifold block assembly according to claim 1, wherein the insulation cover includes:
    gaskets provided at both ends of the hydrogen connection path and the air connection path and preventing leakage of hydrogen or air flowing through the hydrogen connection path or the air connection path.

* * * * *